US008295491B2

(12) United States Patent
Armknecht et al.

(10) Patent No.: US 8,295,491 B2
(45) Date of Patent: Oct. 23, 2012

(54) METHOD FOR AGGREGATING DATA IN A NETWORK

(75) Inventors: Frederik Armknecht, Worms (DE); Joao Girao, Leimen (DE); Dirk Westhoff, Neustadt an der Weinstrasse (DE)

(73) Assignee: NEC Europe Ltd., Heidelberg (DE)

( * ) Notice: Subject to any disclaimer, the term of this patent is extended or adjusted under 35 U.S.C. 154(b) by 480 days.

(21) Appl. No.: 12/597,607

(22) PCT Filed: Apr. 25, 2007

(86) PCT No.: PCT/EP2007/003639
§ 371 (c)(1), (2), (4) Date: Oct. 26, 2009

(87) PCT Pub. No.: WO2008/131787
PCT Pub. Date: Nov. 6, 2008

(65) Prior Publication Data
US 2010/0135494 A1 Jun. 3, 2010

(51) Int. Cl.
*H04L 9/08* (2006.01)

(52) U.S. Cl. ........ 380/281; 380/270; 380/277; 380/278; 380/279

(58) Field of Classification Search .................. 380/281, 380/284, 270, 277, 278, 279
See application file for complete search history.

(56) References Cited

U.S. PATENT DOCUMENTS 7,609,838 B2 * 10/2009 Westhoff et al. .............. 380/270
7,702,905 B2 * 4/2010 Girao et al. .................... 713/163
7,907,548 B2 * 3/2011 Westhoff et al. .............. 370/256
2007/0078817 A1 4/2007 Girao et al.
2007/0165844 A1 * 7/2007 Little ............................. 380/30
2008/0253327 A1 * 10/2008 Kohvakka et al. ............ 370/330
2009/0060201 A1 * 3/2009 Rhodes et al. ................ 380/279
2009/0268909 A1 * 10/2009 Girao et al. .................... 380/259

FOREIGN PATENT DOCUMENTS

JP 2000155789 A 6/2000
JP 2005295543 A 10/2005
JP 2006157896 A 6/2006

OTHER PUBLICATIONS

International Search Report dated Feb. 14, 2008 in PCT application.

(Continued)

*Primary Examiner* — Krisna Lim
(74) *Attorney, Agent, or Firm* — Young & Thompson

(57) ABSTRACT

A method for aggregating data in a network, particularly in a wireless sensor network, wherein the network (1) includes a plurality of sensor nodes ($N_i$) to measure data and at least one sink node (S) at which the data measured by the sensor nodes ($N_i$) are aggregated, and wherein each sensor node ($N_i$) encrypts its measured data with a key k and forwards the result towards the sink node (S), is characterized in that, in the context of a key distribution within the network (1), a master key K is chosen, and that the master key K is autonomously split up by the network (1) into individual keys $k_i$ to be used by the sensor nodes ($N_i$) for encrypting measured data, with the sum of all individual keys $k_i$ being equal to the master key K.

17 Claims, 3 Drawing Sheets

OTHER PUBLICATIONS

Castelluccia C. et al: "E.cient Aggregation of encrypted data in Wireless Sensor Networks", Mobile and Ubiquitous Systems: Networking and Services, 2005. MobiQuitous 2005. The Second Annual International Conference on San Diego, CA, USA Jul. 17-21, 2005, Piscataway, NJ, USA, IEEE, pp. 109-117.

Haowen Chan et al: "Random key predistribution schemes for sensor networks", Proceedings of the 2003 IEEE Symposium on Security and Privacy. S&P 2003. Berkeley, CA, May 11-14, 2003, Proceedings of the IEEE Symposium on Security and Privacy, Los Alamitos, CA : IEEE Comp. Soc, US, pp. 197-213.

Westhoff et al., "Concealed Data Aggregation for Reverse Multicast Traffic in Sensor Networks: Encryption, Key Distribution, and Routing Adaptation", IEEE Transactions on Mobile Computing, vol. 5, No. 10, Oct. 2006.

Japanese Office Action dated Apr. 11, 2012, from corresponding JP application.

* cited by examiner

METHOD FOR AGGREGATING DATA IN A NETWORK

BACKGROUND OF THE INVENTION

The present invention relates to a method for aggregating data in a network, particularly in a wireless sensor network, wherein the network comprises a plurality of sensor nodes to measure data and at least one sink node at which the data measured by the sensor nodes are aggregated, and wherein each sensor node encrypts its measured data with a key $k_i$ and forwards the result towards the sink node.

DESCRIPTION OF THE RELATED ART

Methods as mentioned above are well-known in practice and are of special importance in the context of wireless sensor networks (WSNs). WSNs are ad-hoc networks composed of, in general, miniaturized sensor nodes with limited computation and energy capacities. Sensor nodes, in general, consist of a probe, a processing unit, a communication device, and a battery and dispose of the functionality of data acquisition, communications and computation.

Wireless sensor networks are becoming increasingly popular in many spheres of life. The field of application of sensor networks includes but is by no means limited to monitoring and controlling machines, controlling (intra- and extra-corporal) health parameters or environmental monitoring (like temperature, humidity and seismic activity measurement). The range of application possibilities is almost infinite, though. In specific application fields, such as water contamination examination or weather forecasting, for example, it is extremely advantageous that the sensor nodes may be manufactured in miniature size making it possible to establish sensor networks even in geographical regions that are hard to access.

The communication among the sensor nodes is performed wirelessly via broadcast messages. This makes sending a highly costly and unreliable operation which should be avoided as much as possible. As a rule of thumb sending is roughly 100-1000 times more energy consuming than one computation step. Therefore, any mechanism that allows the reduction of the transmission helps to improve the time life of a WSN.

One possible approach for transmission reduction is data aggregation. In certain fields of operation, the user is not interested in the individual measurements but rather in their aggregation, e.g. their sum or the average value. In these cases, it is not necessary to send all measurements from the sensor nodes up to the sink node. Instead, these data can be processed within the network and only the result, e.g. the sum, is forwarded. As the data size of the sum is much smaller than the concatenation of all the summands, this helps to lower the transmission overhead.

As sensor nodes, due to their limited capacities, in general, do not comprise a tamper resistant unit security issues as regards a concealed communication among the nodes is crucial. Particularly in WSNs with a massive number of sensor nodes aiming at a deployment in a volatile, untrusted or even hostile environment nodes must be equipped with security mechanisms which support message exchange between the nodes.

Stimulated by the observation that for non tamper resistant sensor nodes, which are most likely for future large scaled sensor networks, hop-by-hop security as it is provided with proprietary solutions like TinySec (the security module of TinyOS) or a standardised security protocol like IEEE 802.15.4 can only provide a very limited overall system security, efficient solutions should aim at mechanisms that provide end-to-end security. In this context, end-to-end security means that only the sink node can access the data that was individually encrypted by the different sensor nodes but no node in between. In the best case, it should be possible to combine end-to-end encryption with data aggregation. Although providing data aggregation with end-to-end security in WSNs is a challenging task due to the highly self-organising distributed structure of WSNs, some progress in this direction has already been made.

For example, in C. Castelluccia, E. Mykletun, and G. Tsudik, *Efficient aggregation of encrypted data in wireless sensor networks*, in 2nd Annual International Conference on Mobile and Ubiquitous Systems Networking and Services, San Diego, Calif., USA, July 2005, the focus is on end-to-end encryption of real-time traffic in synchronous WSNs and a stream cipher-based symmetric encryption transformation is proposed. By using pairwise keys, the scheme provides a high system security. Also, the pre-distribution of keys is quite simple as the keys can be randomly distributed to the nodes and only the sink nodes needs to store all the keys. However, the benefit of the overall system security comes at the cost of additional overhead. Firstly, the nodes' configuration before node deployment requires a pairwise pairing between each sensor node and the sink node to agree on the shared key. Secondly, although the sink node is considered to be equipped with much more memory than a sensor node, if one is aiming at large scaled sensor networks, the storage of thousands or hundreds of thousands of pairs (ID, key) may turn out to be a serious problem. Thirdly, since the focus is on security solutions over a highly unreliable medium one cannot ignore the impact of packet loss on the wireless broadcast medium. Revealing per data transmission the key IDs respectively node IDs of all the currently involved nodes therefore becomes mandatory for converge-cast traffic encrypted with the privacy homomorphic encryption scheme by Castelluccia, Mykletun and Tsudik. This enormously increases the size of the transmission data that has to be sent by the nodes. As sending is by far the most costly operation in terms of energy consumption, this approach reduces the life time of a WSN and therefore decreases the users' acceptance.

BRIEF SUMMARY OF THE INVENTION

It is therefore an object of the present invention to improve and further develop a method of the initially described type for aggregating data in a network in such a way that by employing mechanisms that are readily to implement a high security is provided for the data aggregation process, while the communication overhead is reduced compared to the schemes according to the state of the art.

In accordance with the invention, the aforementioned object is accomplished by a method characterized in that, in the context of a key distribution within the network, a master key K is chosen, and that the master key K is autonomously split up by the network into individual keys $k_i$ to be used by the sensor nodes for encrypting measured data, with the sum of all individual keys $k_i$ being equal to the master key K.

According to the invention it has first been recognised that a high security level with a reduced communication overhead can be realised by implementing a key distribution process within a network that is based on a master key K that is autonomously split up by the network into individual keys $k_i$ to be used by the sensor nodes for encrypting measured data. The autonomous splitting up of the master key K is performed in such a way that the sum of all individual keys $k_i$ is equal to the master key K. By this means a self-organised key distribution is realized, making this process more comfortable for the network's owner/administrator since the nodes configuration before node deployment does not require a pairwise pairing between each sensor node and the sink node to agree on a shared key. Furthermore, the method according to the invention does not require additional data overhead when sending encrypted traffic towards the direction of the sink node. Moreover, by employing pairwise unique keys for end-to-end encryption a high overall system security is achieved since there is no lack of security at single sensor nodes.

Advantageously, the master key K is chosen by the sink node. The sink node, in general, is equipped with much more power and storage capacity than a sensor node. This factor together with its central roll within the network predestines the sink node for initiating the key distribution process. As regards a further improvement of security it proves to be advantageous that the master key K is solely stored at the sink node. In this case only the sink node is enabled to decrypt the final aggregated value by applying the master key K to the received ciphers. It is pointed out that the sink node knows the sum K stored in the sensor network without knowing the individual keys $k_i$.

Preferably, the flow of data in the network has a converge-cast traffic structure. This kind of structure that is directed towards a central point—the sink node—is best suited for a key distribution scheme that supports the establishment of pairwise unique keys for end-to-end encryption.

Concretely, each sensor node of the network may have one predecessor node (that is closer to the sink node than the sensor node itself). The only exception may be the sink node which—as the destination point of the converge-cast traffic structure—does not have any predecessor node. Accordingly, looking away from the centre of the network, the sensor nodes may have one or more successor nodes. In this context it becomes clear to someone skilled in the art, that not every sensor node will have a successor node. For example, the outermost sensor nodes of a network do not have a successor node. Such nodes could be denominated as leaf nodes, thereby referring to the tree or tree like structure of the sensor network.

In an especially advantageous way, means are provided by which each sensor node is informed of its relative position within the network. In other words, after an initial bootstrap phase each sensor node knows his predecessor node and his successor nodes. In this regard it is to be preferred that the sensor nodes in the network are quasi stationary after once being distributed. It is to be noted that a sensor nodes' knowledge of its relative position does not include location-awareness with respect to its absolute position.

Based on the relative position information it may be provided that each sensor node, in the context of the key distribution process, upon receipt of a certain subtotal $K_i$ of the master key K from its predecessor node splits up the value $K_i$ into a number n of subtotals $K'_i$. As regards an optimal adaptation to the network's structure each sensor node may define the number n of subtotals $K'_i$ in accordance with the number of its direct successor nodes. For example, if a sensor node knows that is has three successor nodes and if this sensor node receives the value $K_i$ from its predecessor node it splits up this value in four subtotals with $K_i=K_i^*+K'_1+K'_2+K'_3$. $K_i^*$ will be used by the sensor node later on to encrypt its data. The other subtotals are passed to the successor nodes to be split up again according to the networks structure and so on. From a security point of view it is advantageous that the sensor node itself only stores $K_i^*$ permanently and deletes the other subtotals from its memory after passing them to the appropriate successors. At the end of the key distribution process, each sensor node possesses one key such that the sum of all the keys distributed within the networks equals the master key K.

In a preferred embodiment at least some of the sensor nodes may function as aggregator nodes by aggregating the measured data of its successor nodes. By this means the number of messages that is needed to transport the measured data of all sensor nodes to the sink node can be reduced drastically. As sending is the most costly operation in wireless sensor networks data aggregation is highly favourable.

The aggregation process carried out by an aggregator node may include the steps of performing an aggregation function on incoming encrypted data, which is forwarded to the aggregator node by its successor nodes, as well as on its own measured encrypted data, and the step of forwarding the aggregated result towards the sink node. Concretely, the aggregation function may be an additional operation, a subtraction operation, a multiplication operation or an inverse multiplication operation.

In an especially advantageous embodiment, the algorithm used for encryption is homomorphic both with respect to the keys $k_i$ used for encryption and with respect to the values $v_i$ to be encrypted. This kind of encryption function is called bihomomorphic. This means that for any two keys $k_1$ and $k_2$ as well as for any two plaintext values $v_1$ and $v_2$, it holds that $$E_{k1}(v_1)E_{k2}(v_2)=E_{k1+k2}(v_1+v_2).$$

A simple example of such an algorithm is $E_k(v):=k+v \bmod n$, where both key k and value v are some integers in the range from 0 to n−1. In the case the aggregation operation is the addition operation the sink node wants to know the sum of the measured values $v_1+\ldots+v_n$, where n denotes the number of sensor nodes in the network. Due to the bihomomorphic structure of the encryption algorithm, the sink node which wants to decrypt $$E_1(v_1)+\ldots+E_{kn}(v_n)=E_{k1+\ldots+kn}(v_1+\ldots v_n)$$

only needs to know the value $k_1+\ldots+k_n$, i.e., the master key K. In contrast, the individual keys $k_i$ are not needed for the decryption. Since the described method aims at large scaled sensor networks, the storage of thousands of pairs (ID, key), which may turn out to be a serious problem, is dispensable. The sink node or any other node that initiates the key and distribution process only needs to know the master key K with $K=k_1+\ldots+k_n$. The aggregator nodes, on the other hand, are not required to perform any decryption operation on the incoming data from its successor nodes like it is required when using conventional hop-by-hop encryption. As previously pointed out, this increases the overall system security since there is no lack of security at the aggregator nodes.

The bihomomorphic algorithm may be deterministic or probabilistic. A deterministic one maps the same pair of key and plaintext always to the same ciphertext, whereas for a probabilistic one this mapping differs with some probability.

In a further preferred embodiment the sink node chooses a random value R as some network wide dummy value which may be distributed within the sensor network in the context of the key distribution process. The value R is employed in such a way that each sensor node $N_i$ stores for each of its successor nodes the value $E_{ki}(R)$, i.e. the ciphertexts of the random value R wherein $k_i$ denominates the keys of the successor nodes. With regard to a highly efficient data aggregation process, each aggregator node in the context of applying the aggregation function employs the default value $E_{ki}$ (R) for those of its successor nodes which do not contribute to the data aggregation process by forwarding a measured value to the aggregator node. By this means non-responding nodes (which, for example, ran out of energy or dropped out due to other failures) can be handled and, as opposed to schemes according to the state of the art, the IDs of responding/non-responding nodes do not need to be provided. Thus, only the aggregated ciphertexts need to be forwarded. This again reduces the communication overhead and, thereby, increases the lifetime of the sensor network. Furthermore, the robustness during the aggregation phase is enhanced what is especially useful due to the highly unreliable medium in which the messages are broadcasted and in which the impact of packet loss can not be ignored. Consequently, even in cases of unreliable links or due to situations in which a subset of nodes can not participate in the sensing and forwarding process, the data aggregation can be performed with high efficiency and security. This is particular effective for sensor networks with a fixed network structure as it is the case for wireless body networks (W-BANs). W-BANs will probably play a prominent role in future e-health architectures as they allow the remote monitoring of customers' health status.

Advantageously, the key distribution is carried out in a secure environment where no attacker is assumed to be in place. After the initial key distribution in the context of an initialization phase, refreshment phases may be provided in which each sensor nodes' key $k_i$ is updated from time to time. In particular, for any deterministic privacy homomorphism used for encryption it is essential to refresh keys ideally after each single aggregation phase. However, for a realistic setting a good balance between the frequency of key refreshment and the required security level should be achieved. It has to be noted that the key refreshment is only useful to support a deterministic privacy homomorphism. For all encryption transformations which are falling into the category of pair-wise probabilistic privacy homomorphism it does not yield any benefits.

In principal, the refreshment phase of the keys may be similar to the key distribution in the initialization phase. The keys $k_i$ may be modified such that the old master key K is replaced by a new master K* such that the sink node only chooses and knows the differences $K-K^*=:\Delta$, but not the individual keys.

Two different embodiments for the key refreshment prove to be advantageous. According to a first embodiment, the difference $\Delta$ is split up and reported to the successor nodes in the same way as the master key K in the initialization phase. Unlike in the initialization phase where no attacker is assumed to be in place, updated keys can not be eavesdropped so that for the key refreshment phases there is no need for a secure environment.

Alternatively, each node stores several keys at the same time, derived from different master keys. In this case, the actual key is equal to a specific linear combination of the stored keys whereas the linear combination is uniquely determined. As opposed to the first embodiment, the second one does not require the transmission of data for the key refreshment.

In a further advantageous embodiment the roles of the sensor nodes are changed from time to time. Such a change results in a longer lifetime of the sensor network as, for example, aggregating incoming data and forwarding them is a more energy consuming task than just sensing and sending the measured values.

There are several ways how to design and further develop the teaching of the present invention in an advantageous way. To this end it is to be referred to the following explanation of a preferred example of an embodiment of the invention, illustrated by the figure on the other hand. In connection with the explanation of the preferred example of an embodiment of the invention by the aid of the figure, generally preferred embodiments and further developments of the teaching will we explained.

DETAILED DESCRIPTION OF THE INVENTION

Figure 1:
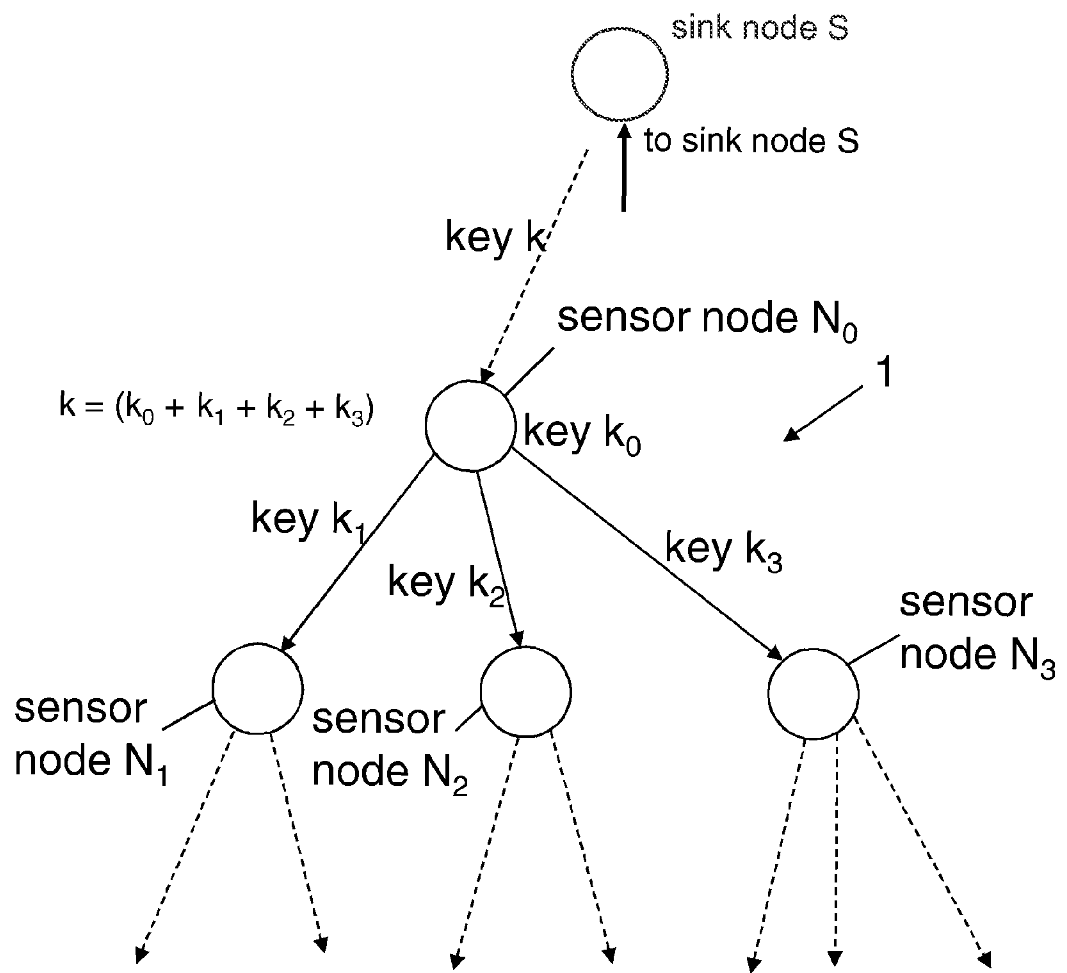
FIG. 1 is a schematic view of an embodiment of a method according to the invention, showing the key distribution.
Figure 3:
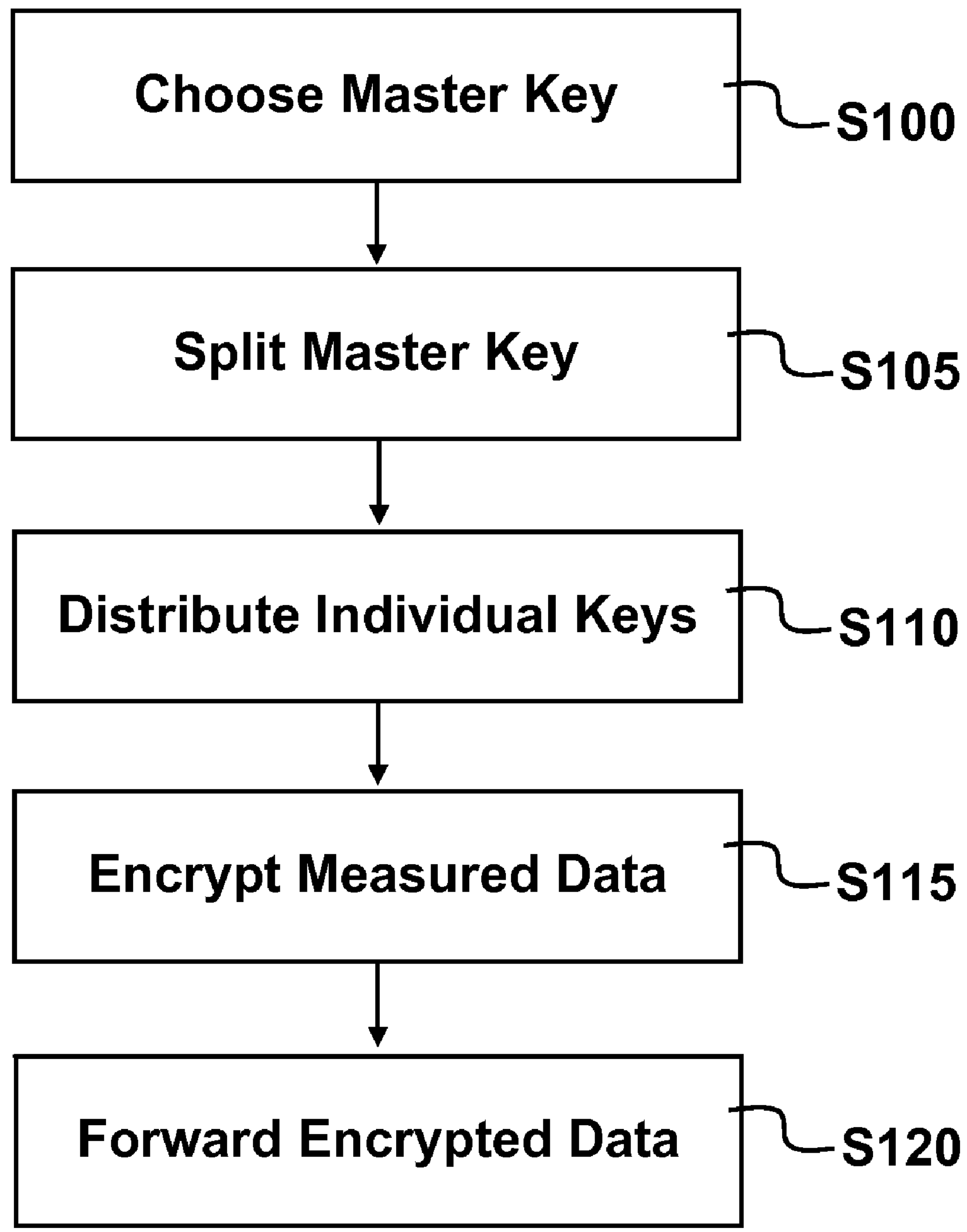
FIG. 3 is a flow chart of the inventive method.

FIG. 1 illustrates schematically an embodiment of the present invention. FIG. 3 is a flow chart of the inventive method.

More precisely, the key distribution process according to the invention is shown. For the purpose of clarity and exemplary illustration, FIG. 1 only shows a very small section of a sensor network 1, the illustrated section comprising only four sensor nodes which are denominated $N_0$, $N_1$, $N_2$, and $N_3$. In practice, however, the sensor network 1 may include several thousands of sensor nodes $N_i$.

The initialization works top-down from the route of the sensor network 1—the sink node S—to the sensor nodes $N_i$. In a nutshell, every sensor node $N_i$ receives at one point in time during the key distribution his share of the master key K which is chosen by the sink node (S100) and which is distributed to the sink nodes' successor nodes in a controlled way. In the embodiment shown in FIG. 1, sensor node $N_0$ receives his share k of the master key K from its predecessor node (not shown). The sensor node $N_0$ is aware of his successor nodes—$N_1$, $N_2$, and $N_3$—and, consequently, splits up his share k of the master key K into four subtotals $k_0$, $k_1$, $k_2$ and $k_3$ (S105) with $k=k_0+k_1+k_2+k_3$ and distributes the three last subtotals to its successor nodes $N_1$, $N_2$, and $N_3$, respectively (S110). The sensor nodes $N_1$ and $N_2$ have two successor nodes, respectively, and, consequently, split up their shares—$k_1$ and $k_2$, respectively—of the master key K randomly into three subtotals and distribute these values to their successor nodes. On the other hand, the sensor node $N_3$ has three successor nodes, and, consequently, splits up his share $k_3$ of the master key K into four subtotals.

At the end of the distribution process, each sensor node $N_i$ has received a single symmetric key $k_i$ whereas all keys $k_i$ are derived from one master key K which is solely stored at the sink node. During the initialization phase as described above the system is highly vulnerable even to passive attacks. Hence, no attacker is assumed be in place during this phase.

Moreover, although not shown in FIG. 1, the sink node S chooses a random value R. The value R is distributed to all sensor nodes $N_i$ of the network 1. For robustness, each sensor node $N_i$ stores for each of its successor nodes the cipher $E_{ki}(R)$ wherein $k_i$ are the respective keys of the successor nodes. For security reasons, each sensor node $N_i$ subsequently deletes all values from its memory except its own key $k_i$ and the encrypted values $E_{kj}(R)$ for its successor nodes.

Figure 2:
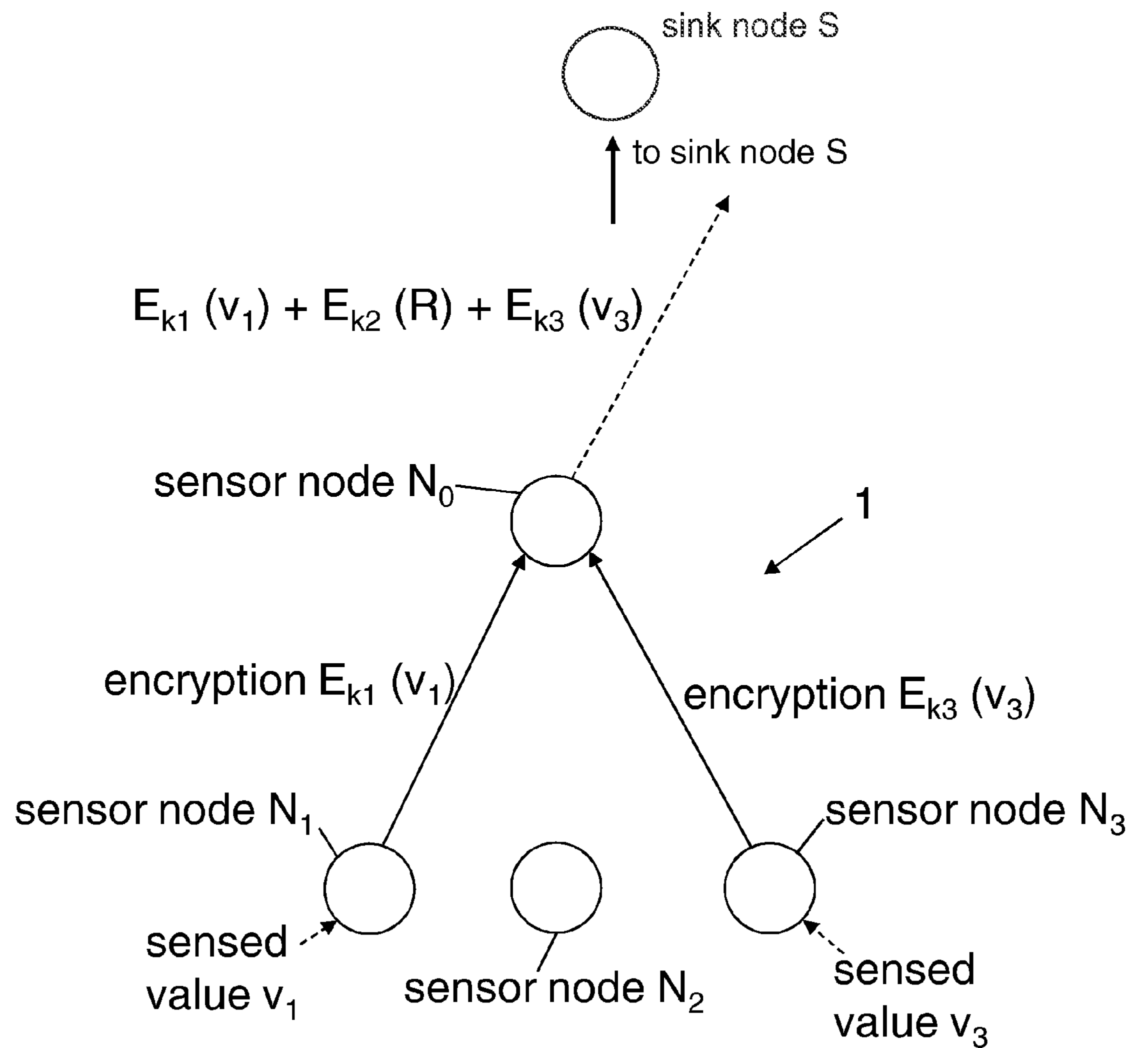
FIG. 2 is a schematic view of an embodiment of a method according to the invention showing the data aggregation.

Referring now to FIG. 2, the same small section of the sensor network 1 as in FIG. 1 is shown. In contrast to FIG. 1, FIG. 2 refers to the data aggregation process. During an aggregation phase converge-cast traffic is encrypted end-to-end from the sensor nodes $N_i$ to the sink node. Each sensor node $N_i$ applies a symmetric homomorphic encryption transformation by encrypting its monitored value with its own unique key and by subsequently summing up the resulting ciphertext to the ciphertexts received from its children/successor nodes.

Referring more particularly to FIG. 2, the sensor nodes $N_1$ and $N_3$ have sensed values $v_1$ and $v_3$, respectively. On the other hand, sensor node $N_2$ is exhausted, for example due to empty batteries, and, as a result, does not contribute with a measured value to the data aggregation process. The sensor nodes $N_1$ and $N_3$ encrypt their measured values with their individual symmetric keys $k_1$ and $k_3$ (S115), respectively, and forward the results $E_{k1}(v_1)$ and $E_{k3}(v_3)$, respectively, to their predecessor node $N_0$ (S120).

As the sensor nodes are aware of their relative position within the network, sensor node $N_0$ realizes that it has not received the data from all its successor nodes $N_1$, $N_2$ and $N_3$. Consequently, it replaces the missing ciphers by the ciphers of a replacement value R which has been distributed during the initialization phase as a network wide dummy value and which is stored by all sensor nodes $N_i$ as described above. As a result, aggregator node $N_0$ forwards $E_{k1}(v_1)+E_{k2}(R)+E_{k3}(v_3)$ to its predecessor node. At the end, the sink node S receives $$E_{\Sigma ki}(\Sigma v_i)E_{\Sigma kj}(\mathrm{ctr}^*R)$$

as well as the value ctr wherein ctr is a first counter that denotes the number of dummy values R contained in the aggregation. As the sink node S furthermore knows K, it can easily derive the sum of all measured and reported values. With respect to the non-responding sensor nodes the sink node S at the end of the aggregation process only needs to know how many dummy values are included in the plaintext but not which specific nodes have responded. The counter ctr is incremented according to the number of non-responding nodes and may be transmitted together with the encrypted measured values.

From the information as described above, the sink node S can recover the sum of the measured and reported values but does not know how many values have been aggregated in total. Since these information may be important, a second counter, resp, may be incorporated which computes the number of responded nodes. The counter resp can be handled like the counter ctr. An aggregator node receives from each responding node $N_i$ a value $resp_i$ and forwards the sum of it to its predecessor node. In the embodiment shown in FIG. 2 the sensor node $N_0$ would forward the counter ctr incremented by the value 1 (resulting from the non-responding node $N_2$) and the counter resp incremented by the value 2 (resulting from the two responding nodes $N_1$ and $N_3$).

Since each sensor node $N_i$ purely stores its own key it can not decrypt the incoming ciphers from its children/successor nodes. Only the sink node S is enabled to decrypt the final aggregated value by applying the master key K to the received ciphers. As previously mentioned, since not always all nodes may have contributed or due to interference on the wireless transmission medium packets may got lost, each intermediate node adds those stored default ciphers $E_{ki}(R)$ to the aggregated ciphered sum which correspond to its direct children which have not provided their input. During an aggregation phase the system is secure against passive and active attacks. No sensor node can decrypt received ciphers. Only the corruption of a full subtree ST(N) would result in gaining knowledge of the aggregated value representing the monitored value of the actual subtree. Subtree ST of a node N in this context is defined as $ST(N)=\{N\}$ if N is a leaf node, otherwise as $ST(N)=\{N\} \text{ u } U_{n' \in Succ(N)} ST(N')$ as the subtree with root N.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for aggregating data in a network (1) comprising a plurality of sensor nodes ($N_i$) to measure data and a sink node (S) at which the data measured by the sensor nodes ($N_i$) are aggregated, comprising the steps of:

a first node (S) choosing a master key (K) for a key distribution within the network;

a second node of the network autonomously splitting the master key (K) into plural individual keys (ki) for use by the sensor nodes (Ni) for encrypting data, where a sum of all the individual keys (ki) is equal to the master key (K);

distributing each of the individual keys (ki) to a corresponding different one of the sensor nodes (Ni) so that each sensor node (Ni) has a different individual key (ki), each different individual key (ki) representing a certain subtotal key (ki) of the master key (K);

each sensor node ($N_i$) encrypting values of measured data with the distributed corresponding individual key ($k_i$); and each sensor node (Ni) forwarding the encrypted measured data towards the sink node (S).

2. The method according to claim 1, wherein the master key K is chosen by the sink node (S).

3. The method according to claim 2, wherein the master key K is solely stored at the sink node (S).

4. The method according to claim 1, wherein the master key K is solely stored at the sink node (S).

5. The method according to claim 1, wherein the flow of data in the network (1) has a converge-cast traffic structure.

6. The method according to claim 1, wherein the sensor nodes ($N_i$), with the exception of the sink node (S), have one predecessor node ($F_{N1}$), respectively, and wherein the sensor nodes ($N_i$) have one or more successor nodes ($C_{Ni}$), respectively.

7. The method according to claim 6, wherein each sensor node ($N_i$), during said distribution step, each sensor node (Ni) receives the certain subtotal key ($K_i$) of the master key K from the predecessor node ($F_{Ni}$) and splits up the certain subtotal key ($K_i$) into a number n of further subtotal keys (K'i), and wherein each sensor node ($N_i$) defines the number N of further subtotal keys (K'i) in accordance with the number of the direct successor nodes.

8. The method according to claim 6, wherein at least some of the sensor nodes ($N_i$) function as aggregator nodes ($A_i$) by aggregating the measured data of the corresponding direct successor nodes ($C_{Ni}$).

9. The method according to claim 8, wherein each aggregator node ($A_i$) performs an aggregation function on incoming encrypted data, forwarded to the aggregator node ($A_i$) by the corresponding direct successor nodes ($C_{Ni}$), and on its own measured encrypted data before forwarding the result towards the sink node (S), and wherein the aggregation function may be an addition operation, a subtraction operation, a multiplication operation or an inverse multiplication operation.

10. The method according to claim 9, wherein each aggregator node ($A_i$), in applying the aggregation function, employs replacement values $E_{ki}$ (R) for those of direct successor nodes ($C_{Ni}$) which do not contribute to the data aggregation process by forwarding a measured value to the aggregator node ($A_i$).

11. The method according to claim 6, wherein, in said choosing step, the sink node (S) chooses a random value R as some network wide dummy value and wherein each sensor node ($N_i$) stores the random value R encrypted with the keys $k_i$ of its successor nodes ($C_{Ni}$) as replacement values $E_{ki}$ (R).

12. The method according to claim 1, comprising a bootstrap phase of informing each sensor node of its relative position within the network by informing each sensor node of a corresponding direct predecessor node and corresponding direct successor nodes.

13. The method according to claim 12, wherein each sensor node ($N_i$), during said distribution step, certain subtotal key ($K_i$) of the master key K from the predecessor node ($F_{Ni}$) and splits up the certain subtotal key ($K_i$) into a number n of further subtotal keys (K'i), and wherein each sensor node ($N_i$) define defines the number N of further subtotal keys (K'i) in accordance with the number of the direct successor nodes.

14. The method according to claim 1, wherein, in said encryption step, an algorithm used for encryption is homomorphic both with respect to the individual keys $k_i$ used for encryption and with respect to the values ($v_i$) being encrypted, and wherein the homomorphic algorithm is one of a deterministic and probabilistic privacy homomorphism.

15. The method according to claim 1, wherein distributing step is carried out in a secure environment.

16. The method according to claim 1, wherein each sensor node's ($N_i$) key $k_i$ is updated from time to time during a key refreshment phase, and wherein key refreshment is carried out after each single aggregation phase.

17. The method according to claim 1, wherein roles of the sensor nodes ($N_i$) are changed from time to time.

* * * * *